United States Patent
Dornan

(10) Patent No.: US 6,254,113 B1
(45) Date of Patent: Jul. 3, 2001

(54) ALL TERRAIN RIDING ASSEMBLY

(76) Inventor: Mark Dornan, 333 Ceder Croft Dr., Brick, NJ (US) 08724

(*) Notice: Subject to any disclaimer, the term of this patent is extended or adjusted under 35 U.S.C. 154(b) by 0 days.

(21) Appl. No.: 09/257,736

(22) Filed: Feb. 25, 1999

(51) Int. Cl.$^7$ ............................................. A63C 17/06
(52) U.S. Cl. .................... 280/87.042; 280/842; 280/843; 280/11.227
(58) Field of Search ................................... 280/842, 843, 280/11.19, 11.22, 11.23, 11.25, 11.27, 11.28, 87.041, 87.042, 11.226, 11.227

(56) References Cited

U.S. PATENT DOCUMENTS

| | | | |
|---|---|---|---|
| D. 214,177 | * | 5/1969 | Greer ............................ 280/87.042 X |
| 1,566,706 | * | 12/1925 | Thomas ............................ 280/11.23 |
| 2,545,543 | * | 3/1951 | Bottrill .............................. 280/11.23 |
| 3,023,022 | * | 2/1962 | Boyden ........................... 280/87.042 |
| 3,282,598 | * | 11/1966 | Goodwin ............................ 280/11.2 |
| 3,362,722 | * | 1/1968 | Core ............................ 280/87.042 X |
| 3,671,055 | * | 6/1972 | Aarup ........................... 280/87.042 X |
| 3,995,873 | * | 12/1976 | Pantzar ............................ 280/87.042 |
| 4,076,267 | * | 2/1978 | Lipscomb ........................ 280/87.042 |
| 4,082,306 | * | 4/1978 | Sheldon ........................... 280/87.042 |
| 4,150,838 | * | 4/1979 | Lappage .......................... 280/87.041 |
| 4,353,566 | * | 10/1982 | Mohlenbrock ................... 280/87.042 |
| 4,738,456 | * | 4/1988 | Creason ............................... 280/842 |
| 5,160,155 | * | 11/1992 | Barachet ......................... 280/87.042 |
| 5,207,454 | * | 5/1993 | Blankenburg et al. .............. 280/843 |
| 5,549,331 | * | 8/1996 | Yun et al. .................... 280/87.042 X |
| 5,794,955 | * | 8/1998 | Flynn .............................. 280/87.042 |

FOREIGN PATENT DOCUMENTS

| 2755440 | * | 6/1979 | (DE) ..................................... 280/842 |
|---|---|---|---|
| 2560775 | * | 9/1985 | (FR) ..................................... 280/842 |

* cited by examiner

Primary Examiner—Michael Mar
(74) Attorney, Agent, or Firm—Louis E. Marn

(57) ABSTRACT

These and other objects of the present invention are achieved by an all-terrain riding assembly comprised of a body member, including a supporting surface for feet of the user disposed between a front housing member having a rotatably mounted roller member and a rear housing member having a rotatably mounted, cylindrically-shaped roller member. A plane defining the supporting surface is below a plane defined by the top portions of the front and rear roller members. In a particular preferred embodiment the rear housing member is articularly mounted to the main body member.

8 Claims, 3 Drawing Sheets

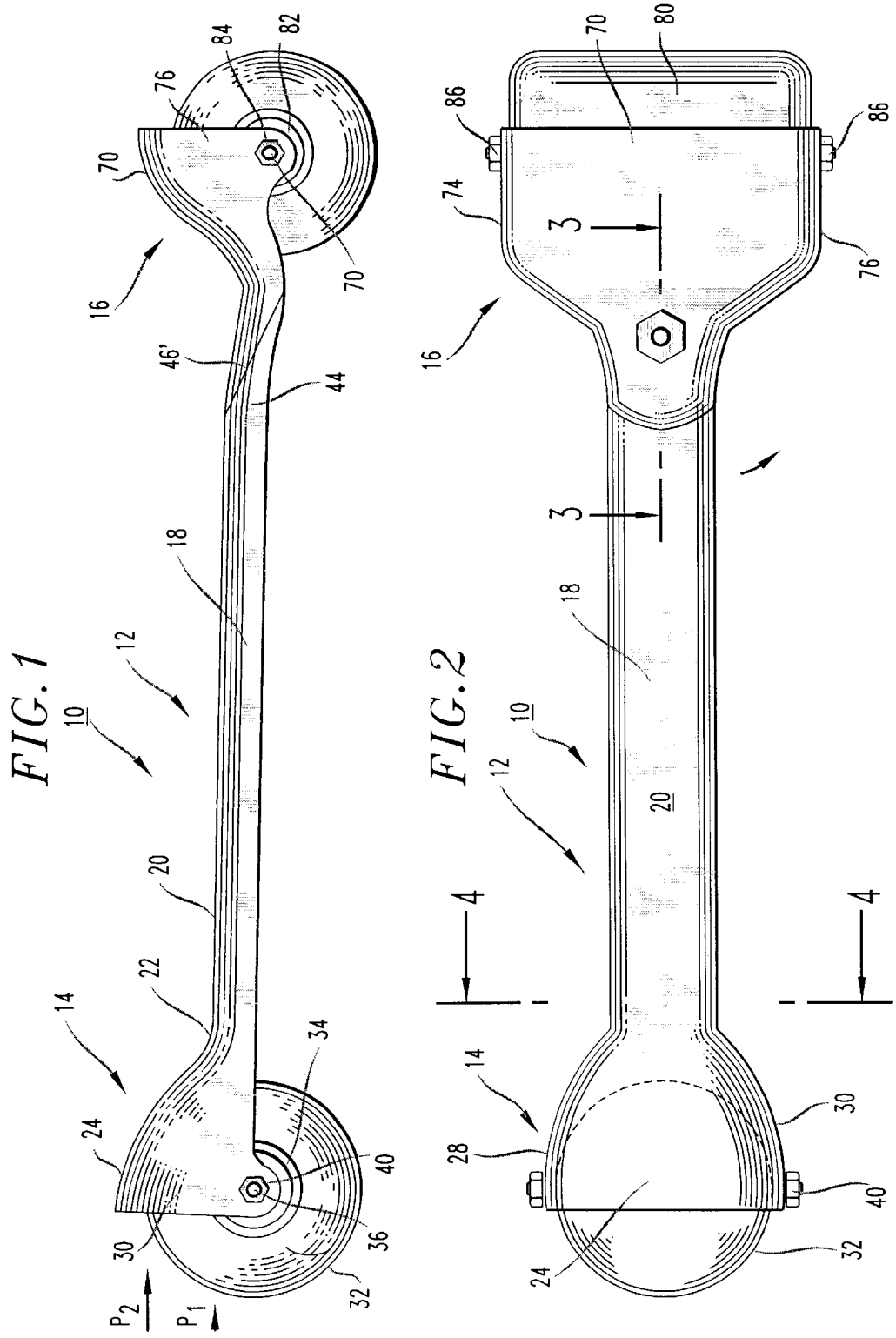

ALL TERRAIN RIDING ASSEMBLY

BACKGROUND OF THE INVENTION

1. Field of the Invention

The invention relates to riding assemblies and more particularly to an all terrain riding assembly.

2. Description of the Prior Art

Rollerskates, rollerblades, skateboards, rollerskis and the like, as means for riding on even terrain such as a road surface have been widely known and used for some time. Skateboards, in particular, have become widely developed and generally comprise a platform large enough for a person to stand on with his or her feet side by side, and front wheel and rear wheel mounted for rotation about spaced apart parallel axes, the wheels being of rounded profile to enable the platform to tilt laterally in use. It is generally intended that the user should stand on the platform with his or her feet on either side of the imaginary line joining the centers of the wheels and should balance himself or herself as the skateboard moves forward.

Such structures are illustrated inter alia in U.S. Pat. Nos. 3,282,598; 3,795,509; 4,150,838; and 5,125,617.

In U.S. Pat. No. 5,794,955 there is disclosed an incline skateboard assembly comprised of a board body member mounted between parallelledly mounted shafts having outer wheel members permitting of facile assembly and disassembly, however, providing readily contact between the feet of the user and the wheel member during use and thereby readily contributing to potential events adverse to the physical well-being of the user. In U.S. Pat. No. 5,160,155, there is described a skateboard having wheels in tandem where the rear wheel may be similarly readily contacted by a foot of the user during use. Accordingly, it is desirable to provide an all terrain riding assembly which minimizes contact between the feet of the user and the wheels and appeals to users of skateboards, inline skates and the like.

OBJECTS OF THE INVENTION

An object of the present invention is to provide for a novel all terrain riding assembly capable of harsh usage with minimal potential for breakage during use.

Another object of the present invention is to provide for a novel all terrain riding assembly which essentially eliminates potential interference with the roller elements by the user during use.

Still another object of the present invention is to provide for a novel all terrain riding assembly capable of facile steering during use.

A still further object of the present invention is to provide for a novel all terrain riding assembly providing a stable riding platform under substantially all terrain conditions.

SUMMARY OF THE INVENTION

These and other objects of the present invention are achieved by an all terrain riding assembly comprised of a body member, including a supporting surface for feet of the user disposed between a front housing member having a rotatably mounted, roller member and a rear housing member having a rotatably mounted, cylindrically-shaped roller member. A plane defining the supporting surface is below a plane defined by the top portions of the front and rear roller members. In a particular preferred embodiment the rear housing member is articularly mounted to the main body member as more fully hereinafter described.

BRIEF DESCRIPTION OF THE DRAWINGS

These and other objects of the present invention will become more readily appreciated by reference to the following detailed description when taken with the accompanying drawings wherein like numerals designate like parts throughout and where;

FIG. 1 is a side elevation view of the all terrain riding assembly of the present invention;

FIG. 2 is a top view of the all terrain riding assembly of FIG. 1;

DETAILED DESCRIPTION OF THE DRAWINGS

Figure 3:
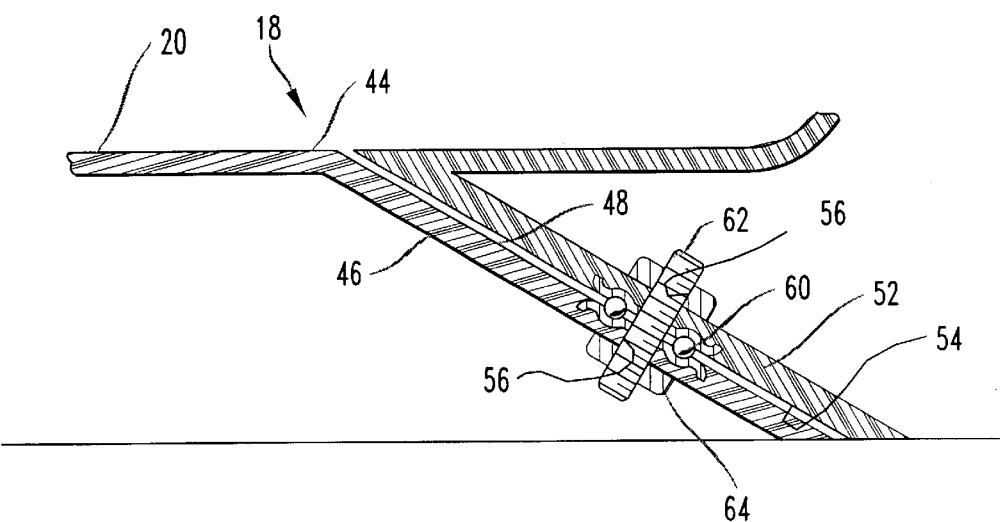
FIG. 3 is an enlarged partial sectional view taken along the line 3—3 of FIG. 2.
Figure 4:
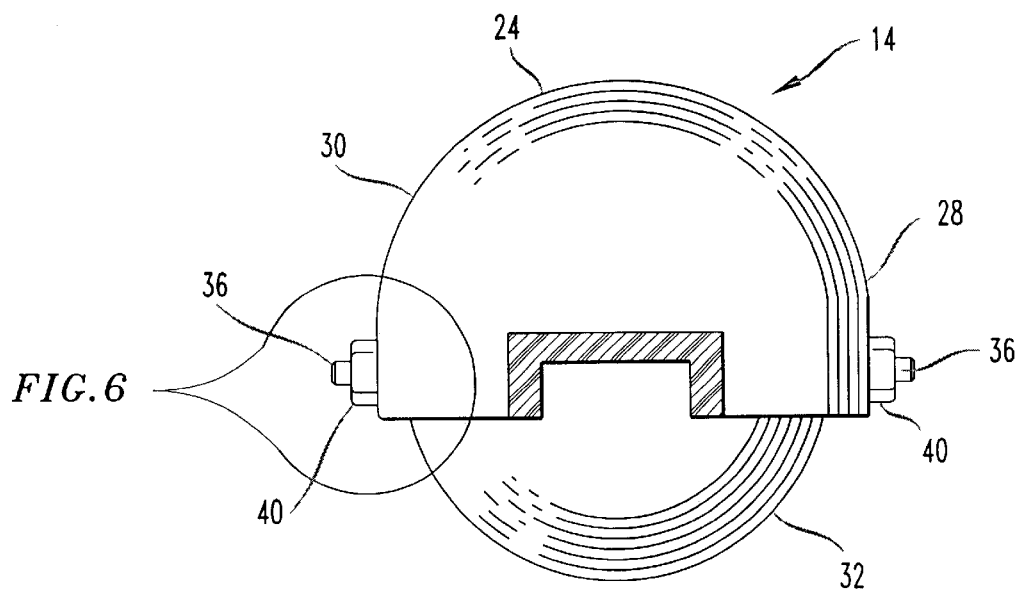
FIG. 4 is a sectional view taken along lines 4—4 of FIG. 2.

Referring now to the drawings, and particularly FIGS. 1 and 2, there is illustrated an all terrain riding assembly, generally indicated as 10, comprised of a main body, generally indicated as 12, positioned between a front housing member and a rear housing member, generally indicated as 14 and 16, respectively. The main body 12 is comprised of an elongated support member 18 having a supporting surface 20 of a length and width to support at least one and preferably two feet of the user as more fully hereinafter disclosed. A forward portion 22 of the support member 18 extends to and is integrally formed with the front housing member 14 comprised of a quadra-spherically-shaped fender 24 including orifices 26 (referring to FIG. 6) formed in left and right shoulder portions 28 and 30 of the front housing member 14.

A spherically-shaped tire or roller member 32 including roller bearing members 34 is positioned for rotation on a shaft 36 including cylindrically-shaped spacer sleeve member 38 (referring to FIG. 6) and mounted within the orifices 26, such as by bolts 40. The spherically-shaped tire or roller member 32 is formed of a flexible resilient material, such as rubber, ABS or the like, and is preferably hollow to reduce weight of the assembly 10. Additionally, the tire or roller member 32 may be formed to be inflatable to a desired pressure as a function of its intended use and concomitant terrain conditions.

A rear portion 44 of the elongated support member 18 (referring now to FIGS. 1 to 3) is formed with an inclined portion 46 having a surface 48 and including an orifice 50 to support a leading inclined portion 52 having a surface 54 including orifice 56 of the rear housing member 16. A bearing member 60 is positioned between the surfaces 48 and 54 of the support member 18 and rear housing member 16 respectively. A threaded lug 62 and nut 64 cooperate to rotatably support the inclined portion 52 of the support member 18 to the leading inclined portion 52 of the rear housing member 14. Thus, the rear housing member 16 is articulately mounted to the elongated support member 18.

Figure 6:
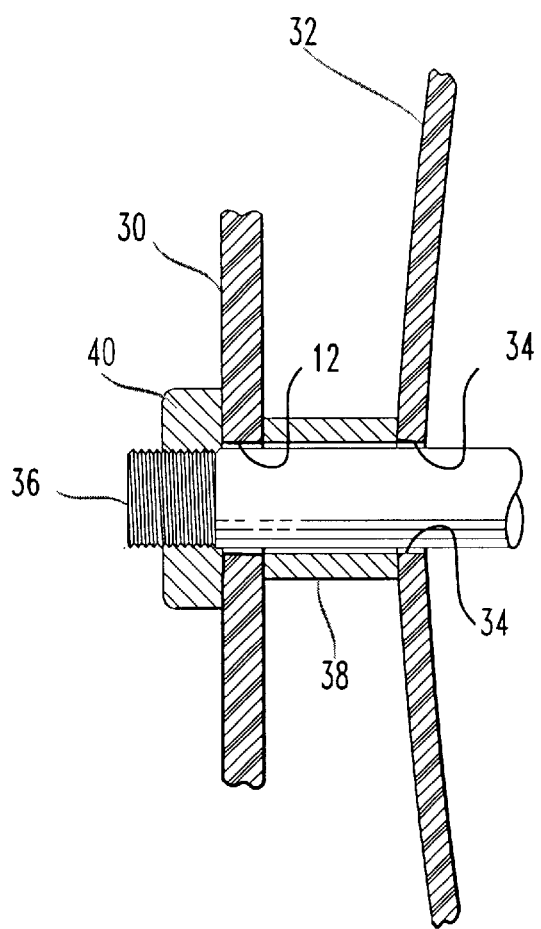
FIG. 6 is an enlarged partial sectional view of FIG. 4.

The rear housing member 16 extends outwardly to a quadra-cylindrically-shaped fender 70 including orifices 72 formed in right and left shoulder portions 74 and 76 of the rear housing member 16. A cylindrically-shaped tire or roller member 80 including roller bearing member 82 is positioned on a shaft 84 including cylindrically-shaped spacer sleeve member 38 (as illustrated in FIG. 6) and mounted within the orifices 72, such as by bolt 86. The cylindrically-shaped tire or roller member 80 is similarly formed of a flexible resilient material, as is the front spherically-shaped tire or roller member 32, and is preferably hollow for weight considerations. Additionally, the cylindrically-shaped rear tire or roller member 80 may be formed to be inflatable to any desired pressure as a function of the intended use and concomitant terrain conditions.

Figure 5:
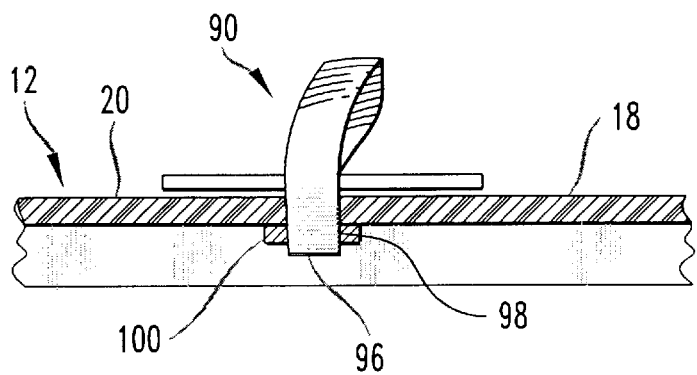
FIG. 5 is an enlarged partial sectional view of a foot supporting member mounted in the body member of the all terrain riding assembly of the present invention.

FIG. 5 is an enlarged partial sectional view of main body 12 and elongate support member 18 having a supporting surface 20. An optional foot support 90 including a strap member having a buckle securing assembly 94 and a threaded mounting member 96 is positioned for rotation in a throughbore 98 formed in the elongated support member 18 and is secured therein by a threaded nut 100. The foot support member 90 assists the user in operation of the all-terrain riding assembly 10. Two such foot support members 90 may be positioned in the support member 18.

A plane ($P_1$) defined by the support surface 18 of the support member 18 of main body member 12 is below a plane ($P_2$) defined by the upper or top rolling surfaces of the front and rear tire or roller member 32 and 80, referring to FIG. 1. Preferably, the plane ($P_1$) of the support surface 20 of the main body member 12 is proximate a horizontal plane defined by the axes of the tire or roller members 32 and 80 thereby to place the center of gravity of the user proximate the rotating axis of the tire or roller members 32 and 80 thereby to provide facile guiding capabilities to the assembly 10 by the user during operation.

As hereinafter discussed, the main body member 12 is rotatably disposed with respect to the rear housing member 16 thereby providing an articulating relationship therebetween to facilitate the user's ability to guide or steer the all-terrain assembly 10 of the present invention during operation. The surface portions 46 and 52 of the main body 18 and rear housing member 16 are formed at an angle of about 30 degrees to the horizontal axis of the support surface 18 of the main body member 12 to provide free rotational relationships therebetween. It will be understood by one skilled in the art that the articulating angle may be varied, it is chosen to provide facile cooperation between the articulating elements to provide required cooperation during use. Additionally, the front housing member 14 may be also articulated mounted to said main body member 12.

The assembly 10 may be formed of any suitable material, e.g. metal, such as aluminum or steel, or a plastic material such as ABS, capable of supporting the weight of a user over both smooth terrain and irregular terrain without breakage after normal use. Thus, the materials and structural configuration are selected to provide design criteria for repetitive use of the assembly. The quadra-spherically-shaped fender 24 and quadra-cylindrically-shaped fender 70 are configured to provide close fitting, but non-interfering relationship to the tire or roller members 32 and 82, respectively, and are dimensioned to deflect and to prevent small impediments from lodging therebetween to interrupt rotation of the rotating member as well as to prevent inadvertent contact by the user to the rolling surfaces of tire or rolling members 32 and 80. The tire or roller member are generally of like diameter and of from 6 to 12 inches, preferably about 8 to 10 inches, but may be as large as 16 to 20 inches. The width of the cylindrically-shaped member is preferably equal to the diameter thereof and may extend to a width of twice the diameter thereof.

Additionally, the preferred embodiment of the present invention includes a spherically-shaped front roller member 32 to provide more effective directional control whereby directional alteration of the front tire or wheel member cause the rolling axis thereof to more readily assume a great circle contacting relationship to the terrain. It will be understood by one skilled in the art that the front wheel or tire member may take other rotating shapes, e.g. oblately-shaped, however, a spherically-shaped front tire or wheel member provides greater stability and steering capabilities.

While the present invention has been described with respect to the exemplar embodiments thereof, it will be recognized by one of ordinary skill in the art that many modifications and changes can be made without departing from the spirit and scope of the invention. Therefore it is manifestly intended that the scope of the invention be limited only by the claims and the equivalents thereof.

I claim:

1. An all-terrain riding assembly, which comprises:

a main body member having a support surface for simultaneously supporting both feet of a user;

front and rear housing members supporting said main body member, said rear housing member articulately mounted to said main body member;

a spherically-shaped roller member formed of a flexible material rotatably positioned within said front housing member; and a cylindrically-shaped roller member formed of a flexible resilient material rotatably positioned within said rear housing member, said cylindrically-shaped roller having a width extending along a rotational axis which is greater than a diameter thereof; and a plane defining said support surface of said main body member is below a plane defined by upper surface portions of said roller members, wherein the rear housing member is adapted to articulate relative to the main body member during steering of the riding assembly.

2. The all-terrain riding assembly in accordance with claim 1 wherein said front housing member is quadra-spherically-shaped to receive said spherically-shaped roller member in close fitting relationship.

3. The all-terrain riding assembly as defined in claim 1 wherein said rear housing member is quadra-cylindrically-shaped to receive said cylindrically-shaped roller member in close fitting relationship.

4. The all-terrain riding assembly in accordance with claim 1 wherein said roller members are inflatable to a select pressure level.

5. The all-terrain riding assembly in accordance with claim 1 wherein said roller members are of a diameter of from about 6 to 10 inches.

6. The all-terrain riding assembly in accordance with claim 5 wherein said diameter of said roller member is preferably 8 to 10 inches.

7. The all-terrain riding assembly in accordance with claim 1 wherein a width of said cylindrically-shaped roller member is not more than about twice the diameter thereof.

8. The all-terrain riding assembly in accordance with claim 1 and further including at least one foot support member mounted for rotation on said main body member.

\* \* \* \* \*